United States Patent [19]

Tofsland et al.

[11] Patent Number: 4,878,929
[45] Date of Patent: Nov. 7, 1989

[54] LIQUID-GAS SEPARATOR

[75] Inventors: Kenneth M. Tofsland; Jeffrey S. Morgan; Eric G. Gryttenholm; Tadeusz Jaroszczyk, all of Stoughton, Wis.

[73] Assignee: Nelson Industries Inc., Stoughton, Wis.

[21] Appl. No.: 304,707

[22] Filed: Feb. 1, 1989

[51] Int. Cl.⁴ .................................. B01D 46/12
[52] U.S. Cl. ............................ 55/486; 55/487; 55/488; 55/498; 55/499; 55/521; 55/527; 210/493.5; 210/497.01
[58] Field of Search ............... 55/486–488, 55/497, 499, 521, 527, 498; 210/168, 499, 493.5, 497.01

[56] References Cited

U.S. PATENT DOCUMENTS

| | | | |
|---|---|---|---|
| 2,701,062 | 1/1955 | Robinson | 210/73 |
| 2,864,505 | 12/1958 | Kasten | 210/73 |
| 3,049,240 | 8/1962 | Smith | 210/73 |
| 3,085,381 | 4/1963 | Sobeck | 210/73 |
| 3,115,459 | 12/1963 | Giesse | 210/73 |
| 3,186,391 | 6/1965 | Kennedy | 210/73 |
| 3,209,916 | 10/1965 | May et al. | 210/73 |
| 3,505,794 | 4/1970 | Nutter et al. | 210/73 |
| 3,800,945 | 4/1974 | Fowler | 210/73 |
| 4,050,237 | 9/1977 | Pall et al. | 60/39.08 |
| 4,233,042 | 11/1980 | Tao | 55/482 |
| 4,253,954 | 3/1981 | Midkiff et al. | 210/168 |

Primary Examiner—Charles Hart
Attorney, Agent, or Firm—Andrus, Sceales, Starke & Sawall

[57] ABSTRACT

A cartridge-type liquid-gas separator having particular use for separating oil from air. The separator includes an outer casing containing an annular pleated first stage filter element and an annular second stage element located concentrically of the first stage element. The first stage filter element is composed of a coalescer section formed of unwoven fibrous material and a disloader section disposed downstream of the coalescer section and composed of multiple layers of fibrous material impregnated with a resin having low surface energy. The first stage element can also include a pair of screens, one located upstream of the coalescer section and a second located downstream of the disloader section. The second stage which is spaced downstream from the first stage is composed of a fibrous stripper layer followed by a screen. The entrained oil contained within the air is coalesced in the coalescer section to form larger size droplets and the disloader aids in discharging the droplets downwardly for collection in the center of the second stage filter unit, while the second stage strips any remaining oil droplets from the air.

12 Claims, 2 Drawing Sheets

FIG. 2
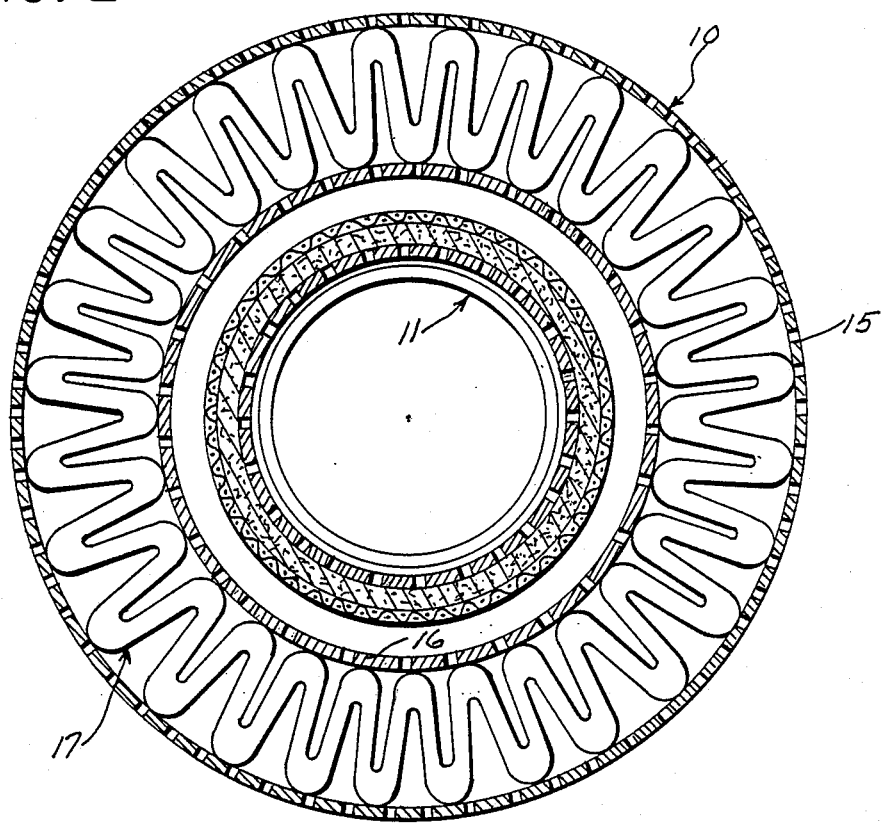
FIG. 3
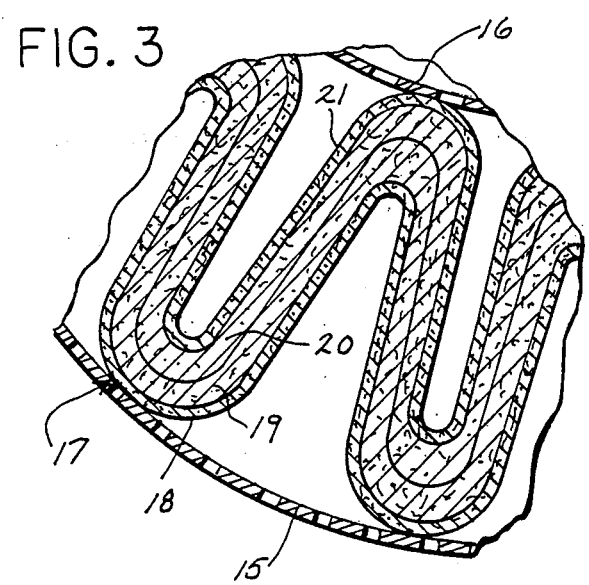
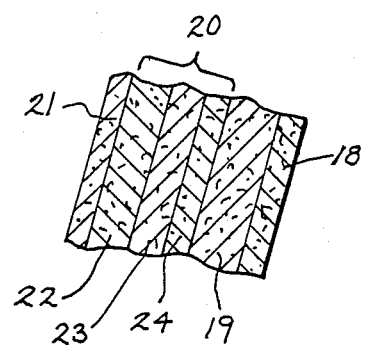
FIG. 4

LIQUID-GAS SEPARATOR

BACKGROUND OF THE INVENTION

Air that is being compressed in a compressor, for example a rotary compressor, is often exposed to oil used to cool and/or lubricate the compressor. As a result, the compressed air can contain a mist of oil particles making the air unsuitable for operation of certain power equipment. In the past, filter assemblies or separators have been employed to remove the oil mist from compressed air. Not only must the separator effectively remove the oil, but must be designed so that it has a minimum restruction to flow.

U.S. Pat. No. 3,505,794 discloses a single stage separator including an annular filter element that is composed of a plurality of longitudinal pleats. The pleated filter element is formed of a plurality of layers of fibrous material, including fibrous material impregnated with activated charcoal, and the entrained oil in the air is coalesced as larger sized droplets which flow downwardly through the element for collection in a lower sump.

U.S. Pat. Nos. 3,085,381, 4,050,237 and 4,233,042 are directed to air-oil separators employing a two stage filter assembly in which the first stage serves to coalesce the entrained oil while the second stage acts to strip any remaining oil from the air. As disposed in the forementioned patents, the coalescing stage is composed of one or more layers of unwoven fibrous material, such as fiber glass.

It has been found that in the coalescor stage of the oil-air separators, as used in the past, a portion of the oil remains in the coalescor bed, saturating it, and thereby restricting the air flow through the coalescor stage. Further, the captured solids in the coalescor stage together with the contained oil, decreases the efficiency of the coalescor. This is due to the fact that the fibers in the coalescor are thin with the spacing between the fibers being minimal. Thus, the captured oil droplets form pools and patches drawing the fibers together and resulting in lower efficiency and an increased pressure drop.

SUMMARY OF THE INVENTION

The invention is directed to an improved liquid-gas separator having particular application for separating oil from compressor exhaust gas. In accordance with the invention, the separator includes an outer casing that contains a cartridge-type, two stage, annular filter assembly. The filter assembly is composed of an upstream, pleated stage and an inner or downstream stripper stage.

The first stage includes a coalescor section composed of unwoven fibrous material, with the fibers having an average diameter in the range of 0.5 to 50 microns and the fibrous layer having a Frazier permeability of 3 to 100. Frazier permeability indicates the volume of air in cubic feet per minute (flow rate) that will flow tghrough one square foot of filter media at 0.5 inches of water pressure loss at standard conditions.

The first stage also includes a disloader section disposed downstream of the coalescor section and engaged with the coalescor section. The disloader section is composed of a plurality of layers of nonwoven, synthetic fibers each coated with a resin having high oil wetability or low surface energy. The layers of the disloader section each have a Frazier permeability in the range of 30 to 800.

In addition, the first stage can also include a pair of screens, one positioned upstream of the coalescor section and one positioned downstream of the disloader section for media support.

The second stage is spaced downstream of the first stage and includes a stripper layer of fibrous synthetic material such as polyester, having a lower permeability than the coalescor section. A screen can be positioned downstream of the stripper layer for media support.

In operation, the air entrained with oil particles enters the coalescor section and the small oil particles are coalesced into larger sized droplets. As the coalescor section is relatively thin, the oil droplets will coalesce primarily in the disloader section and will flow easily down through the resin coated synthetic media to the oil sump in the lower end of the casing. As a result of this disloading action, the efficiency of the separator is increased and the pressure drop is decreased.

Other objects and advantages will appear in the course of the following description.

BRIEF DESCRIPTION OF THE DRAWINGS

The drawings illustrate the best mode presently contemplated for carrying out the invention.

In the drawings:

FIG. 2 is a transverse section taken along line 2—2 of FIG. 1;

FIG. 3 is an enlarged fragmentary view of the first stage of the separator;

FIG. 4 is a further enlarged fragmentary view of a portion of the first stage.

DESCRIPTION OF THE ILLUSTRATED EMBODIMENT

Figure 1:
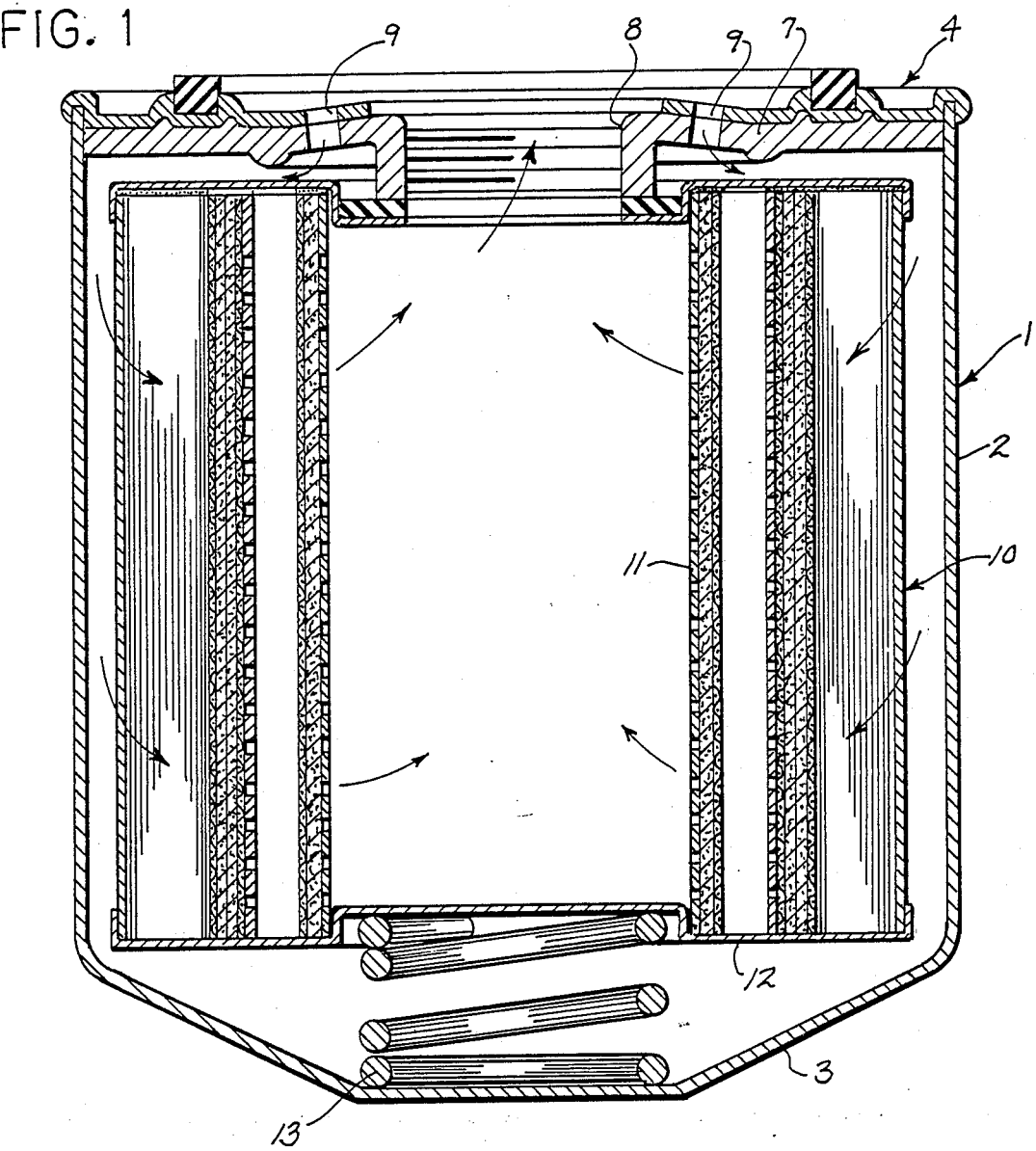
FIG. 1 is a side elevation of the separator of the invention with parts broken away and utilizing out-in flow.

The drawings show a cartridge-type liquid-gas separator having particular use in separating oil or hydrocarbons from a gas such as air.

The separator includes an outer casing 1 composed of a generally cylindrical shell 2 having an open upper end and a tapered lower head 3. The open upper end is enclosed by a cover assembly indicated generally by 4. The center section of second stage filter unit 11 provides a sump for the collection of oil, as will be hereinafter described.

Cover assembly 4 consists of a cover plate 7 having a central threaded outlet opening 8 and a series of inlet openings 9 which are located in a circular pattern and are concentric with the central opening 8. The openings 9 serve as inlets for the compressed air being discharged from a compressor and the air after passing through the separator will be discharged through the central outlet 8.

Located within the casing 1 is a two stage annular filter assembly that includes an outer first stage filter unit 10 and an inner second stage filter unit 11. As shown in FIG. 1, the lower end of the filter assembly bears against the outer annular portion of a base or tray 12, and spring 13 is interposed between head 3 and the central portion of base 12 and urges the filter assembly upward against the cover plate 7. The construction of the casing 1 is in itself conventional.

The first stage filter unit 10 is annular in shape and as best illustrated in FIG. 3, includes an outer cylindrical support 15, preferably formed of perforated metal and an inner cylindrical support 16 also composed of perforated metal. A longitudinally pleated assembly 17 is located between the cylindrical supports 15 and 16 and, as best shown in FIG. 3, includes an outer screen 18, a coalescor section 19, a disloader section 20 and an inner screen 21. The pleated configuration of assembly 17 increases the effective surface area of the first stage filler unit.

Coalescor section 19 is composed of a sheet or sheets of unwoven, randomly disposed, fibers, such as glass fibers or synthetic-glass or synthic fibers. the fibers have an average fiber diameter of 0.5 to 50 microns and the layer has a thickness of 0.03 to 1.0 inch, and a Frazier permeability of 3 to 100.

Disloader section 20, as shown in FIG. 4, is preferably composed of a plurality of layers such as 22, 23, and 24, each composed of unwoven, randomly disposed synthetic fibers which are coated with a resin having a low surface energy, or in other words a high oil wetability. The synthetic fibers of layers 22-24 have an average fiber diameter of 2 to 500 microns. Each of the layers 22-24 has a thickness in the range of 0.01 to 0.75 inches so that the total thickness of the disloader section 20 is in the range of 0.03 to 2.25 inches. Each layer 22-24 has a Frazier permeability of 30 to 800.

In practice, the disloader section 20 can be composed of an upstream layer of acetate fibers and two downstream layers of polyester fibers. The resin used to coat the layers 22-24 is preferably a resin such as polyvinylchloride.

The downstream screen 21, as well as upstream screen 18, can be formed of metal or synthetic material, such as nylon, and serve as media support.

Figure 5:
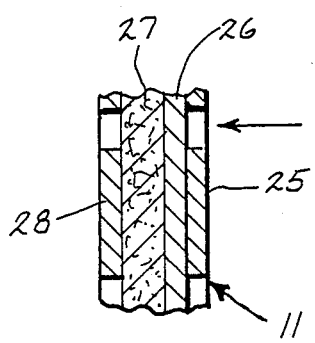
FIG. 5 is an enlarged fragmentary view of the second stage of the separator.

The second stage filter 11, as best shown in FIG. 5, includes an upstream cylindrical, expanded metal support 25 and a layer of filter media 26 is located on the downstream side of support 25. The media layer 26 has a greater permeability than the coalescor layer 18 and is formed of randomly or uniformly disposed fibers, such as glass or synthetic fibers having an average fiber diameter of 1 to 500 microns, a Frazier permeability of 50 to 1000, and a thickness of 0.05 to 1.0 inch.

A screen 27, formed of metal or synthetic material such as nylon, is located on the downstream side of media layer 26 and positioned on the downstream side of the screen 27 is an inner cylindrical support 28 formed of perforated metal.

In operation, the air flow is from the outside-in through the filter assembly. The air containing oil mist and solid particulate material initially passes through the outer screen 18 into the coalescor section 19. As the screen 18 has a relatively high porosity, the screen will not become clogged even at high solid loadings. In the coalescor section 19, the entrained oil is coalesced or agglomerated into larger sized droplets and the majority of the droplets are then discharged downwardly through the disloader section 20 to the center of the second stage filter unit 11. The resin coated synthetic fibers of layers 22-24 facilitate the downward flow of the droplets through the disloader section to prevent clogging of the first stage filter with oil droplets or puddles thereby increasing the efficiency of the coalescing operation and at the same time producing a minimum pressure drop.

Any remaining oil droplets in the air are removed as the air passes through the second stage filter 11 and the oil droplets will again be discharged downwardly through the fibrous layer 26 to the center of the second stage filter unit 11.

To drain oil accumulating within the bottom center portion of the second stage filter unit 11, a recirculating line, not shown, is connected between the center section of second stage filter unit 11 and the compressor to recirculate oil by a pressure differential back to the compressor.

The separator of the invention substantially improves the efficiency of the separation of oil and solid particulate material from the air while producing a minimum pressure drop through the separator. Further, the separator is capable of operating under low air pressure.

Various modes of carrying out the invention are contemplated as being within the scope of the following claims particularly pointing out and distinctly claiming the subject matter which is regarded as the invention.

We claim:

1. A gas liquid separator, comprising a casing having an inlet to receive a gas containing entrained liquid and having an outlet, first stage filter means disposed within the casing, second stage filter means disposed within the casing and located downstream of said first stage filter means, said first stage filter means including a coalescor section composed of unwoven fibrous material having an average fiber diameter of 0.5 to 50 microns and having a Frazier permeability of 3 to 100, said first stage filter means also including a disloader section disposed downstream and in engagement with said coalescor section and composed of a plurality of contiguous layers of snythetic fibers coated with a resin having a low surface energy, said disloader section having a Frazier permeability of 10 to 600, said second stage filter means consisting of a mass of filter media having a greater permeability than said coalescor section.

2. The separator of claim 1, wherein said first and second stage filter means are generally cylindrical in shape and are mounted concentrically.

3. The separator of claim 2, wherein said first stage filter means is located radially outward of said second stage filter means and is provided with a plurality of longitudinally extending pleats.

4. The separator of claim 1, wherein said coalescor section is composed of non-woven fibrous material.

5. The separator of claim 1, wherein the layers of said disloader section are composed of nonwoven synthetic material.

6. The separator of claim 1, wherein said resin has a low surface tension.

7. The separator of claim 1, wherein the filter media of said second stage is composed of nonwoven fibrous material.

8. The separator of claim 1, wherein said first stage filter means also includes a pair of screens, one of said screens being disposed upstream of said coalescor section and the other of said of said screens being disposed downstream of said disloader section.

9. A liquid gas separator, comprising an outer casing having an inlet to receive a gas containing entrained liquid and having an outlet to discharge the gas, an annular pleated first stage element disposed within the casing, an annular second stage element disposed within the casing and mounted concentrically of said first stage element, said first stage element comprising a coalescor section composed of unwoven fibrous material having an average fiber diameter of 0.5 to 50 and a Frazier permeability of 3 to 100, said first stage also including a disloader section disposed downstream of said coalescor section and disposed in engagement with said coalescor section, said disloader section composed of a plurality of contacting layers of synthetic fibers coated with a resin having low surface energy, said layers of said disloader section each having a thickness in the range of 0.01 to 0.75 inch and having a Frazier permeability of 30 to 800, said second stage including a layer of fibrous material composed of unwoven synthetic fibers and having a greater permeability than that of said coalescor section.

10. The separator of claim 9, wherein the fibrous material of said second stage has a Frazier permeability in the range of 50 to 1000.

11. The separator of claim 9, wherein said coalescor section also includes a pair of screens, one of said screens being located upstream of said coalescor section and the second of said screens being located downstream of said disloader section.

12. The separator of claim 11, wherein said first stage also includes a pair of perforated cylindrical metal supports, one of said supports being disposed upstream of said first screen and the second of said cylindrical supports being disposed downstream of said second screen.

* * * * *